US010912009B2

(12) United States Patent
Labbé et al.

(10) Patent No.: US 10,912,009 B2
(45) Date of Patent: Feb. 2, 2021

(54) METHOD FOR DISCOVERING A NODE OF AN AD HOC NETWORK

(71) Applicant: AIRBUS DEFENCE AND SPACE SAS, Toulouse (FR)

(72) Inventors: Patrick Labbé, Antony (FR); Olivier Legoix, Goussainville (FR); Cédric Le Fur, Chatillon (FR); Dejan Radovanovic, Maisons-Alfort (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 15/747,997

(22) PCT Filed: Jul. 25, 2016

(86) PCT No.: PCT/EP2016/067666
§ 371 (c)(1),
(2) Date: Jan. 26, 2018

(87) PCT Pub. No.: WO2017/017059
PCT Pub. Date: Feb. 2, 2017

(65) Prior Publication Data
US 2018/0220355 A1    Aug. 2, 2018

(30) Foreign Application Priority Data
Jul. 29, 2015   (FR) ..................... 15 01630

(51) Int. Cl.
*H04W 40/24*    (2009.01)
*H04W 8/00*    (2009.01)
(Continued)

(52) U.S. Cl.
CPC ......... *H04W 40/246* (2013.01); *H04W 8/005* (2013.01); *H04W 84/18* (2013.01); *H04W 88/16* (2013.01)

(58) Field of Classification Search
CPC ... H04W 40/246; H04W 8/005; H04W 88/16; H04W 84/18
See application file for complete search history.

(56) References Cited

U.S. PATENT DOCUMENTS

2003/0163528 A1    8/2003    Banerjee et al.
2003/0179742 A1*    9/2003    Ogier ................... H04L 1/1614
370/351
(Continued)

OTHER PUBLICATIONS

Routing in HF Ad-Hoc WANs Eric E. Johnson, Zibin Tang, Manikanden Balakrishnan, Huiyan Zhang, and Srugun Sreepuram Klipsch School of Electrical and Computer Engineering1 New Mexico State University, MILCOM 2004-2004 IEEE Military Communications Conference (Year: 2004).*
(Continued)

*Primary Examiner* — Jeffrey M Rutkowski
*Assistant Examiner* — Chae S Lee
(74) *Attorney, Agent, or Firm* — Pillsbury Winthrop Shaw Pittman LLP

(57) ABSTRACT

A method for discovering a network among a plurality of mobile nodes, which includes: a first mobile node periodically transmitting a first signal including an invitation token including data relating to an identity of the node which transmits the token; a second mobile node detecting the first signal; transmitting a second signal including at least one acknowledgement of the invitation token; creating a radio bubble, the communications between the nodes of the radio bubble being coordinated by transmitting a speech token between the nodes; and creating an IP sub-network between the nodes of the radio bubble, each node including an IP address.

20 Claims, 4 Drawing Sheets

(51) Int. Cl.
   *H04W 84/18* (2009.01)
   *H04W 88/16* (2009.01)

(56) References Cited

U.S. PATENT DOCUMENTS

2005/0152305 A1* 7/2005 Ji .......................... H04L 45/54
                                                          370/328
2008/0316997 A1   12/2008 Zeng et al.
2016/0366563 A1* 12/2016 Carrere ............. H04B 7/18506

OTHER PUBLICATIONS

Kurtulus, T., "Improvement and Development of High-Frequency Wireless Token-Ring Protocol," Dec. 2010, XP055280625 (Year: 2010).*

International Search Report as issued in International Patent Application No. PCT/EP2016/067666, dated Dec. 22, 2016.

Ergen, M., et al., "WTRP—Wireless Token Ring Protocol," IEEE Transactions on Vehicular Technology, vol. 53, No. 6, Nov. 2004, XP011122477, pp. 1863-1881.

Johnson, E. E., "HF Radio Mesh Networks," MILCOM 2006, Oct. 2006, XP031331734, pp. 1-5.

Johnson, E. E., et al., "Routing in HF Ad-Hoc WANs," 2004 IEEE Military Communications Conference, Oct. 2004, vol. 2, XP010825827, pp. 1040-1046.

Johnson, E. E., et al., "Token Relay with Optimistic Joining," Military Communications Conference 2005, Oct. 2005, XP010901496, pp. 1-7.

Kurtulus, T., "Improvement and Development of High-Frequency Wireless Token-Ring Protocol," Dec. 2010, XP055280625, Retrieved from the Internet: URL: http://citeseerx.ist.psu.edu/viewdoc/download?doi=10.1.1.633.8647&rep1&type=pdf [retrieved on Jun. 15, 2016.].

Bi., Y., et al., "A Multi-Channel Token Ring Protocol for QoS Provisioning in Inter-Vehicle Communications," IEEE Transactions on Wireless Communications, vol. 8, No. 11, Nov. 2009, XP011284811, pp. 5621-5631.

* cited by examiner

METHOD FOR DISCOVERING A NODE OF AN AD HOC NETWORK

CROSS-REFERENCE TO RELATED APPLICATIONS

This is the U.S. National Stage of PCT/EP2016/067666, filed Jul. 25, 2016, which in turn claims priority to French Patent Application No. 1501630, filed Jul. 29, 2015, the entire contents of all applications are incorporated herein by reference in their entireties.

FIELD

The field of the invention relates to methods for transmitting information within a network of mobile nodes deployed notably at sea. The invention more particularly relates to the field of data exchange protocols in a constrained and dynamic environment. Finally, the field of the invention relates to that of ad hoc networks making it possible to establish a dynamic IP network from infrastructures supporting radiofrequency links between mobile nodes.

PRIOR ART

At present, ad hoc networks exist which make it possible to establish communications and to reserve resources for mobile nodes. Generally, such a network does not involve a base station to enable a dynamic configuration and to establish new communications with a new incomer.

These needs are in part developed in wireless telecommunications networks and in military networks requiring adaptability of the topology of the network such as, for example, in tactical or theatre networks.

On the other hand, when the rates of radio channels are limited, a strict management protocol (deterministic) of channel accesses has to be implemented in order to optimise the use of the available rate. A protocol accepting collisions (statistical management) can only be deployed when the rates of the channels are sufficiently high to enable an over-dimensioning of operational needs and when the items of radio equipment are sufficiently agile to tune into the channel immediately after a transmission. At present, mobile ad hoc networks based on strict management of resources are limited by the rates offered to support an IP type network topology.

Among strict modes of managing bandwidth resources, one solution making it possible to define a multiplexing mode known as TDMA, designating "time division multiple access", may be employed.

This access management protocol makes it possible to organise communications between different nodes so as to limit interference between the different transmitters.

On the other hand, a radio protocol based on a TDMA may be in contradiction of interests with an IP type network layer, in particular when there are a large number of nodes and when access to a wide data band is envisaged, and may constitute an important limitation to data exchanges in terms of latency and rate. Indeed, an IP network requires the generation of acknowledgement messages between the different nodes and actual needs tend towards an increase in transmission rates. The solution of a TDMA for segmenting transmitting paths over time does not enable the optimised deployment of such a network. In addition, TDMA logic can lead to under-employment of the available resource in so far as the access time reserved for a node may not be used entirely and the remainder cannot be made available to another node.

Another difficulty of an ad hoc radiocommunications network is the limitation of the radio ranges of the nodes, notably at sea. There exists a need to enable relay modes, notably to widen the coverage of the network, but also to reach new mobile nodes. Thus, in such a network, a new entering mobile node can communicate with a node out of radio range thanks to one or more intermediate nodes making it possible to play the role of communication relay.

The reliability of such a network is particularly difficult to assure because it is necessary that a new incomer can declare itself without knowing the nature of the network and that conversely the topology of the network is shared with it so that it can know the accessible nodes.

Furthermore, such networks have to offer considerable capacities for reconfiguration, allocation of increased resources to enable broadband communications and interoperability to support communications based on different data protocols. It is particularly difficult in an ad hoc network offering considerable reconfiguration flexibility to enable a total deployment without operating or electing nodes to assure roles of "regulators" or supervisors of the correct operation of the network. Yet, the allocation of such roles is not in the spirit of the IP protocol which leaves a large autonomy to the network itself.

Finally, such a network may be connected to third party networks or access points offering particular services. Such connections or services have to be able to be deployed throughout the mobile network, which also imposes the definition of role and prioritisation of certain nodes. Yet, the definition of role and prioritisation in an ad hoc network is particularly difficult to implement given that the network is possibly ceaselessly reconfigurable according to the new incomers and the new outgoers.

There exists a need to define a method for establishing a network or a sub-network between different mobile nodes in a dynamic manner and based on parameters offering a considerable capacity for adaptation and reconfiguration while offering physical channels to support an IP network between mobile nodes.

SUMMARY OF THE INVENTION

The invention aims to overcome the aforesaid drawbacks.
One object of the invention relates to a method for discovering a network among a plurality of mobile nodes. The method for discovering of the invention includes:
  An antenna of a first mobile node periodically transmitting a first radiofrequency signal including an invitation data frame, referred to as invitation token, an invitation token comprising data relating to an identity of the node which transmits said token;
  A second mobile node detecting the first signal and decoding the invitation token of the first node;
  An antenna of the second node transmitting a second radiofrequency signal including at least one acknowledgement of the invitation token, said transmission being carried out in an assigned time window subsequent to the reception of the invitation token;
  Creating a radio bubble, said communications between the nodes of the radio bubble being coordinated by the transmission of a speech token between said nodes, the transmission of said token between the nodes of a radio bubble defining a transmission sequence between the different nodes;

Creating an IP sub-network between the nodes of the radio bubble, each node including an IP address.

One advantage of the invention is to enable the creation of an ad hoc IP network while minimising the infrastructures required to establish such a network. One advantage is to favour the creation of an IP network of mobile nodes, for example at sea, in a dynamic manner while facilitating the arrival of new incomers and the leaving of nodes disconnecting from the network. Another advantage is the definition of a compromise enabling the establishment of a physical network by radio channel between compatible nodes of an IP protocol, favouring the data rate and minimising the latency times of communications.

Advantageously, the creation of the radio bubble is subsequent to the reception of at least acknowledgement of the invitation token.

According to one embodiment, a radio bubble is associated with a frequency channel shared between the nodes of said radio bubble.

According to one embodiment, a speech token or an invitation token includes:
  a priority indicator of a node of the radio bubble and/or;
  an indicator of a transmission mode among a looped mode and a relayed mode specifying if need be the identity of the relay node.

According to one embodiment, a maximum size of time window is determined by a node of which the priority is maximum in a radio bubble.

According to one embodiment, an analysis of the priority indicator makes it possible to transmit the identity of the priority node of a radio bubble when it exists.

In other words, the discovery token and/or the speech token includes if need be the identity of a priority node of the radio bubble.

According to one embodiment, a first node having already discovered at least one second node and having already generated a first radio bubble in a first frequency channel and discovering a third node determines, as a function of:
  the number of nodes in the radio bubble and;
  the value of the priority indicator of already discovered nodes of said radio bubble,
  the integration conditions of the $3^{rd}$ node among which:
  the third node integrates the first radio bubble joining the two other nodes, the first radio bubble including three nodes of which the communications are organised by the transmission of a speech token between said three nodes;
  a new radio bubble is formed between the third node and the first or second node, one of the first or second nodes not then being integrated in the new radio bubble thereby formed, the first radio bubble being terminated;
  the third node is not invited to integrate the first radio bubble.

According to one embodiment, the discovery operates by the transmission of an invitation token by the first node to which the third node responds favourably in an assigned time window.

According to one embodiment, beyond a number of three nodes, the discovery of a fourth node can lead to different scenarios according to the priority of each node of which:
  the integration of the fourth node in the radio bubble implying the leaving of one of the three nodes already present in said radio bubble;
  the integration of the fourth node in the radio bubble implying the leaving of two of the three nodes already present in said radio bubble;
  the fourth node is not invited to integrate the radio bubble.

According to one embodiment, the first node indicates that it is a relay node in the invitation token from the indicator of transmission mode.

According to one embodiment, a relay node is configured to determine if data received from a second node are either relayed to a third node or processed by the relay node and vice versa data transmitted by the third node and received by the relay node. In this case, the second node and the third node are called nodes visible to the relay node. It is considered in this case that the two nodes visible to the relay node are not within the radio horizon of each other.

According to one embodiment, when the first node detects a maximum priority indicator of the third node and when a new radio bubble is defined between the first and third node, the second node is excluded from said radio bubble and the first radio bubble is terminated.

According to one embodiment, the invitation token or the speech token transmitted by a first node includes, moreover:
  radio topology data including a set of identities of nodes already discovered by the first node of a first radio bubble;
  topology data of a known IP network of the first node including:
    the set of known IP sub-networks of each node of the radio bubble;
    the IP addresses of each known node of the nodes of the IP sub-network corresponding to the first radio bubble,
    the MAC addresses of the routers associated with each known node.

According to one embodiment, at least one node determines a transmission configuration, also called indicator of a transmission mode, of a speech token according to the configuration of the nodes discovered imposing the activation or the de-activation of a relayed mode and if need be a choice of a relay node, said transmission configuration being transmitted to the other nodes by:
  a generation of an indicator of a relay mode in the invitation token and/or the speech token;
  a generation of an identity of the next node having to receive the speech token.

According to one embodiment, the method for discovering includes:
  An establishment of a first radio bubble between three nodes, of which at least one node is a relay node, and the two other nodes being nodes visible to the relay node and not being within the radio horizon of each other, said relay node relaying by radio channel the speech token along one direction to establish a transmission loop of the speech token between the three nodes;
  A reception by a first node visible to the relay node of an invitation token coming from another node of the first radio bubble;
  A transmission to the relay node by the second node visible to the relay node of the new topology of the radio bubble comprising:
    at least the identity of the first node visible to the relay node discovered by the second node visible to the relay node and;
    an indicator of transmission mode designating the looped mode;
  A transmission by the node having transmitted the invitation to the relay node of information including the discovery of the third node and indicating a new topology of the radio bubble;
  A suspension of the relay mode.

According to one embodiment, the transmission frequency of the speech token is higher than that of transmission of an invitation token.

According to one embodiment, the transmission frequency of the invitation token within a radio bubble is configurable by the node of highest priority.

Another object of the invention relates to a method for exchanging data between at least two mobile nodes of an ad hoc IP network, said IP network including at least two IP sub-networks connected through a node connected to these two IP sub-networks, referred to as junction node. The method for exchanging data includes:

A first exchange of a speech token in turn within a set of nodes forming a first radio bubble corresponding to a first IP sub-network and in which the mobile nodes are known to each other, each node including radio transmission means, referred to as radio chain, enabling it to exchange data in a first frequency band with at least one other node of the first radio bubble in transmission time windows coordinated by the circulation of the speech token;

A second exchange of speech token making it possible to coordinate data exchanges within a second radio bubble corresponding to a second IP sub-network and including a plurality of nodes;

An IP addressing of at least one IP frame by a node of the first IP sub-network destined for a node of the second IP sub-network thanks to routing means and a routing protocol comprised in each node, said node having knowledge of an IP topology of the first IP sub-network, said IP frame being encapsulated in a radio frame and transmitted in the first radio bubble destined for the junction node;

A transmission of the IP frame to the destination node of the second IP sub-network through the junction node, said junction node including:
- a second radio chain making it possible to transmit the IP frame encapsulated in a radio frame to the destination node of the second radio bubble,
- a switching table making it possible to associate an identity of a known node with a radio chain of the junction node;

Another object of the invention relates to a controller of data of a mobile node. The controller of the invention includes:

One to 4 radio interfaces for transmitting and receiving radio frames coming from at least one radio chain within a frequency channel;

a memory for storing:
topology data of at least one radio bubble comprising:
at least one set of identities of nodes communicating in said bubble thanks to an allocated frequency channel;
a priority indicator of said node, this indicator being specific to each radio interface;
an indicator of a transmission mode of said node;
a switching table associating:
identities of nodes in a radio bubble with the router MAC addresses, each node being associated with a router;
identities of nodes in a radio bubble with an addressing of at least one radio chain;

a calculator for processing radio topology data in reception comprising:
the analysis of a priority indicator in the radio frames received making it possible to modify if necessary the topology of at least one radio bubble;
the analysis of an indicator of a transmission mode making it possible to modify if necessary the topology of at least one radio bubble;
a generation of radio frame headers as a function of IP data received and a comparison of these data with the switching table, the radio frames being transmitted to a radio chain;
a processing of the radio frames received to generate IP frames to an output interface.

According to one embodiment, the data controller of a mobile node includes a calculator for:
receiving and generating a speech token;
receiving and generating an invitation token periodically so as to engage a method for discovering in the event of reception of a response to an invitation;
processing the steps of the method for discovering of the invention;
processing the steps of the method for exchanging data of the invention.

Another object of the invention relates to a communication system of a mobile node for the exchange of IP data in an ad hoc network. The system of the invention includes:
At least one radio chain including means for transmitting and receiving radiofrequency signals;
At least one controller of the invention;
An IP router for processing the IP frames coming from the controller and for determining their routing in the IP network.

BRIEF DESCRIPTION OF THE FIGURES

Other characteristics and advantages of the invention will become clear from reading the detailed description that follows, with reference to the appended figures, which illustrate.

DESCRIPTION

Radio Links

Figure 1:
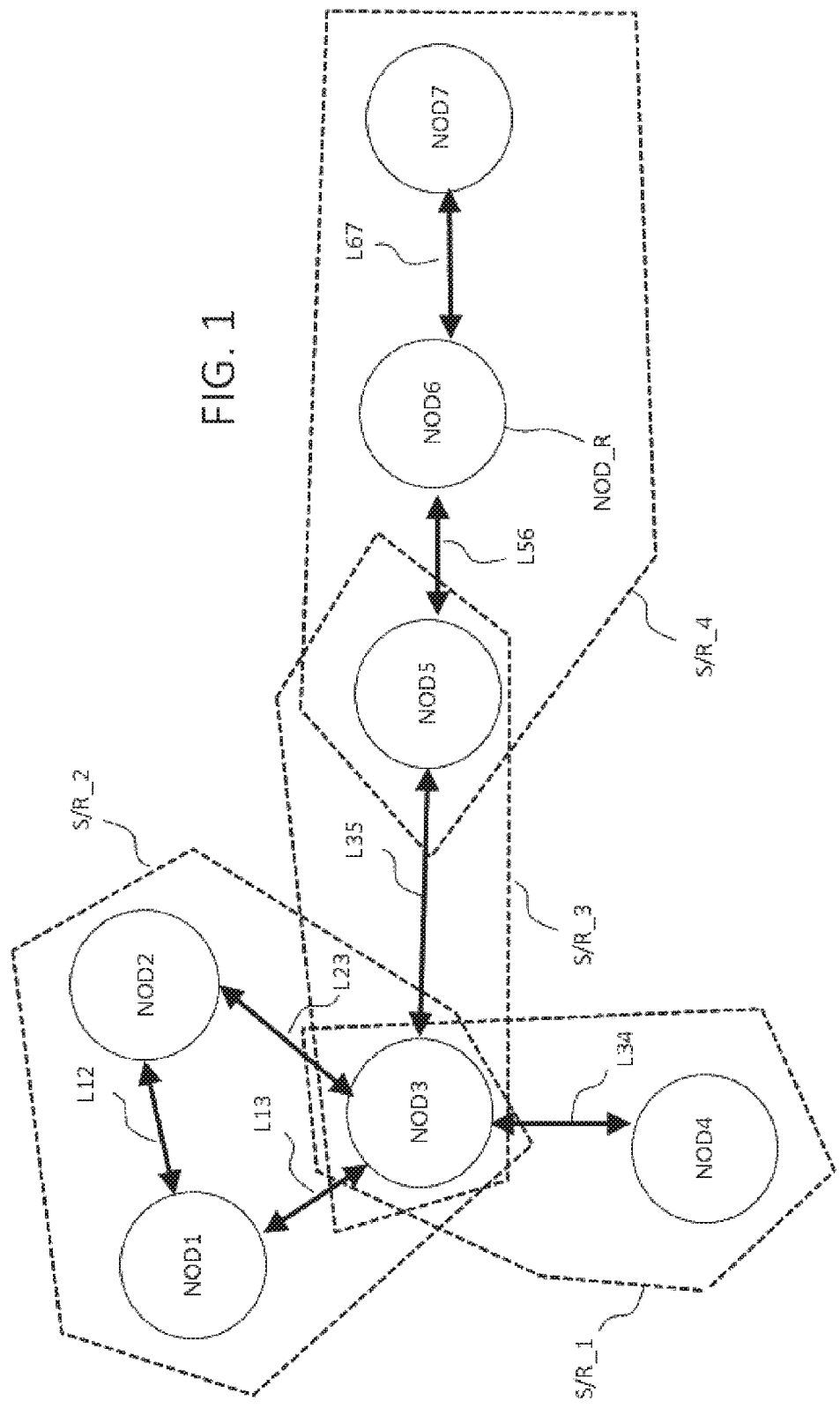
FIG. 1: a network established according to the method of the invention among a plurality of mobile nodes based on radio links.

FIG. 1 describes an ad hoc network of mobile nodes noted $NOD_{i, i \in [1;N]}$. In the example described hereafter the mobile nodes $NOD_{i, i \in [1;N]}$ are ships or boats including a radio link antenna enabling the reception and the transmission of data. In one embodiment of the invention, the radio links are transmitted in the frequency band V/UHF. According to other embodiments, other frequency ranges may be used to establish radio links between mobile nodes.

Radio Horizon

In FIG. 1 are represented the radio links L12, L13, L23, L34, L35, L56, L67 between each node $NOD_{i, i \in [1;N]}$ seeing a neighbour within its "radio horizon". The radio horizon represents the radio range sufficient to establish communication between two mobile nodes. It is possible in the maritime sector and according to the frequency ranges used that the radio horizon is limited notably by the transmission powers used and by the curvature of the earth. Other phenomena can limit the radio range between two mobile nodes such as the directivity of an antenna but which are not detailed further herein. It is considered that two nodes have substantially the same radio horizons. However, in certain configurations, such as for example between a satellite and a ship or between two ships having antennas of different powers or different heights of antennas, the radio horizons are not equivalent. In this case, the two nodes will be able to establish a radio bubble together when each node enters into the radio horizon of the other node.

The radio links are represented when a node is within the radio horizon of another node. As an example in FIG. 1, the mobile node NOD1 is not within the radio horizon of the node NOD4 and vice versa.

Nodes

A node is a physical entity which a priori may be considered as mobile according to the invention. A node is thus capable of moving in space, on land or at sea according to the nature of the node, its configuration and the frequency band used. The nodes are thus, for example, maritime, terrestrial or aerial mobile nodes. The network may comprise a plurality of these nodes or a combination of these different types of nodes.

The methods and the controller of the invention may also be applied to a fixed node connected to the network, said network including at least one mobile node.

A node includes means for radio transmission and reception over at least one frequency channel. The invention most generally relates to nodes including means making it possible to establish links on different channels as required in order to establish links among different radio bubbles.

A node includes means for processing signals making it possible to receive, transmit, modulate, demodulate, amplify and filter all the types of radio signals compatible with radio transmission protocols which can be employed by the methods of the invention. More commonly, the node includes a radio stage capable of processing the data of signals transmitted and received by the radio node, this radio stage is also called radio chain.

A node includes a controller making it possible to carry out processings on streams of transmitted and received data. Notably, the controller is capable of decoding, encapsulating and de-encapsulating data frames. The controller includes calculation means and at least one memory to carry out operations on the transmitted and received data such as for example data comparisons or checksums.

The controller includes interfaces notably making it possible to route data to a user terminal, a router or the radio stage. Conversely, the interfaces make it possible to receive data from these different components.

According to one embodiment, the controller is capable of processing the coordination of transmissions and their sequences in a radio bubble when a speech token or invitation is received or transmitted. The data exchanges between the controller and the radio stage may be managed automatically thanks to the analysis of the data of a speech token.

According to one embodiment, a reliable time source making it possible to time stamp the reception or the transmission of such a token may be used. According to another embodiment, the reliable time source is not necessary since the transmission of the token and the use of the internal clocks of the equipment make it possible to coordinate the ends of reception of a node and the start of transmission of this same node. Furthermore, in the embodiment in which the speech token is transmitted after the data to transmit of a node, this directly marks the end of the message. This solution constitutes an additional advantage of the configuration of such a network and independence vis-à-vis an external time source.

A node of the IP network may comprise a router. According to one embodiment, all the mobile nodes of the IP network each include a router. The router is capable of addressing IP frames on appropriate interfaces and of calculating routing tables in an IP network including a set of IP sub-networks. The controller is capable of processing radio topological data in order to transmit them to other nodes of a same radio bubble during a method for discovering for example.

When a node is evoked in a radio context, the notation "radio node" may be employed given that the node includes an identity in a radio bubble. The notion of "radio node" is associated with the role of the node in the radio bubble which is assured by its radio chain(s) and its controller. The operation of a radio node can be considered like a switch which is capable of addressing the radio chains as a function of the data transmitted by the router and of transmitting a speech token within a radio bubble to organise data exchanges.

When a node is evoked in an IP context, the notation "IP node" may be employed given that the node includes an IP address in an IP sub-network and in the IP network. The notion of "IP node" is associated with the role of the node in the IP network and the IP sub-network or sub-networks known by this node. A routing protocol, such as for example OSPF, makes it possible to organise the distribution of the routing data in the IP network. Finally, the controller makes it possible to deliver IP packets to the router and to receive IP packets to address to a node of a radio bubble thanks to a switching table.

A node in the present invention may at the same time be considered as a radio node and an IP node due to the fact that the items of equipment that support each function are jointly located on the same node.

The interfaces of the different items of equipment may include MAC addresses and/or IP addresses. One advantage of the controller of the invention is that it makes it possible to be free of IP topology when communications have to be delivered. Thus, the IP controller addresses messages to the router by associating its interface with a MAC address that it knows. Nevertheless, this interface of the router may also be associated with an IP address which is not necessarily known to the controller. This architecture, from the viewpoint of the controller, makes it possible to dissociate the IP networks layer from the radio data link layer or the physical layer. This advantage makes it possible to make the controller of the invention even more interoperable.

Sub-Networks and Junction Nodes

Figure 2:
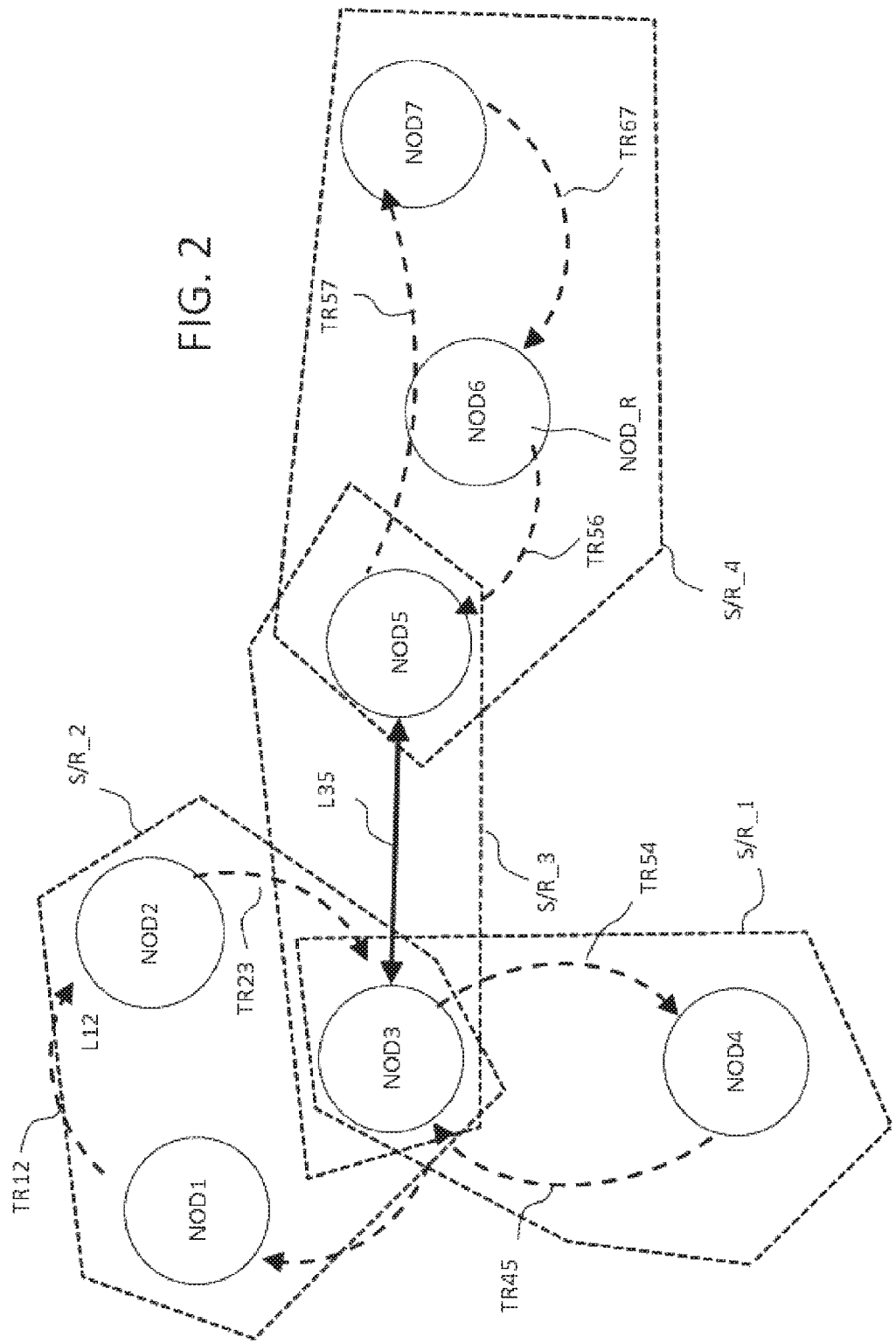
FIG. 2: the network established according to the method of the invention of FIG. 1 representing exchange links of a speech token for coordinating transmissions in radio bubbles.

The sets of nodes represented in FIGS. 1 and 2, of which the sets S/R_1, S/R_2, S/R_3, S/R_4, represent radio bubbles in which the radio nodes exchange data. The radio bubbles each preferentially include between two and three mobile nodes. This limitation makes it possible to optimise a given rate within a radio bubble.

The IP sub-networks have the same notations S/R_1, S/R_2, S/R_3, S/R_4 as the radio bubbles because the invention makes it possible to associate an IP sub-network with each radio bubble.

The IP sub-networks are connected together through junction nodes which make it possible to establish communication gateways between different IP sub-networks. This gateway is formed thanks to the presence of an IP router and a topology of the IP network broadcast to all the nodes and thus to each router. Each node may potentially become a junction node from the moment that it supports a radio system enabling it to establish at least two radio bubbles in different frequency channels. The notion of "junction node" only has a sense in IP topology. According to radio topology, which makes it possible to define radio bubbles, the radio nodes of a radio bubble do not see the radio nodes of an adjacent radio bubble, for example a bubble connected by a junction node comprising two radio chains. It is the IP router that enables the passage from one radio bubble to another radio bubble while addressing the appropriate radio chain of a node through the controller.

One advantage of the invention consists precisely in ensuring radio bubbles and IP sub-networks correspond, in terms of nodes, in such a way as to extend an ad hoc IP network step by step through radio bubbles. A given number of radio bubbles may be supported by a same node in so far as it includes a number of radiofrequency antennas equivalent to the given number of envisaged radio bubbles. Preferentially, a junction node will support at the most four radio bubbles, which comes down to specifying that such a node will include four transmission/reception radio chains. According to one exemplary embodiment, the four radio chains may be supported by four antennas making it possible to establish communications in four distinct channels. According to another example, the four radio chains may use elements making it possible to switch and to multiplex the signals to different types of antenna to form dedicated channels. The latter example may have the advantage of reducing the number of antennas carried in a node. A junction node is, for example, a node belonging to two radio bubbles each configured in two different frequency channels. A junction node is also a node belonging to two IP sub-networks. Thus, a junction node is capable of transmitting to the node of an IP sub-network the IP topology of the IP sub-networks that it knows.

It may be noted in FIG. 1 that:
  the sub-network S/R_2 is connected to the sub-network S/R_1 through a junction node NOD3.
  the sub-network S/R_1 is connected to the sub-network S/R_3 through a junction node NOD3.
  the sub-network S/R_2 is connected to the sub-network S/R_3 through a junction node NOD3.
  the sub-network S/R_4 is connected to the sub-network S/R_3 through a junction node NOD5.

In this case, the node NOD3 plays a role in three radio bubbles S/R_1, S/R_2, S/R_3 by allocating three distinct frequency channels to each radio bubble. From a "radio" topological viewpoint, the node NOD3 includes three distinct radio chains allocating three different channels. The signals, once received and demodulated by one of the three antennas of NOD3, are decoded by the controller in such a way as to extract automatically IP data frames. The IP data frames and the IP headers are then re-transmitted:
  either to a radio interface to be re-routed in the radio network;
  or to a local interface to be processed by an equipment of the IP node in question.

The node NOD3 only has one IP address and may thus apply different processing operations to the IP data received according to whether the IP frames are addressed to it or if the IP frames have to be routed to another node.

Thanks to the correspondence of the radio bubbles and the IP sub-networks, NOD3 and NOD5, which are in a same radio bubble S/R_3, enable the establishment of communication between:
  the IP sub-network S/R_2 and the IP sub-network S/R_4 through the IP sub-network S/R_3;
  the IP sub-network S/R_1 and the IP sub-network S/R_4 through the IP sub-network S/R_3.

Communications between different IP sub-networks not directly connected together is possible thanks to the method for discovering of the invention in which the IP topologies have been exchanged between the different nodes during their discovery.

One advantage of the invention is to limit the number of nodes accessible to a radio bubble in order to:
  on the one hand, guarantee a minimum data rate threshold during communications while limiting interference thanks to:
  on the other hand, the coordination of data exchanges permitted by the exchange of a speech token imposing successive speech times of the different nodes.

FIG. 2 represents notably two communication modes within different radio bubbles among which there is a "looped" mode and a "relayed" mode. The two modes are based on the transmission of a speech token step by step to coordinate transmissions within a same radio bubble, that is to say in a given frequency channel.

Speech Token

According to one embodiment, the protocol for exchanging a speech token is substantially that of the token ring protocol developed by IBM. The operation of such a protocol is based on a distribution of transmission windows within a plurality of nodes.

According to a first alternative, the node of a radio bubble which has the speech token transmits the data and terminates its communications by the re-transmission of a speech token indicating the next node having to receive the token. This solution makes it possible to use a time window adapted to needs. Notably, when the duration for transmitting data is shorter than the window size, the transmission of the speech token makes it possible to shorten the maximum size of the transmission window. If the duration for transmitting data is longer than the maximum window size, the data will be placed in a queue and sent in different parts after the speech token has circulated in the radio bubble several times.

According to a second alternative, the speech token may be transmitted prior to the transmission of data. In the latter case, a time window during which transmissions of said node is reserved. Then, when the time window has gone by, the node terminates its transmission.

The node having received the speech token re-transmits it in turn to another node or the same node, if the sub-network only includes two nodes. In its turn, the new node receiving the speech token has a transmission time window that is reserved for it.

One advantage of a communication mode based on the exchange of a speech token is to avoid loss of information during radio exchanges, to reduce interference and to guarantee a data rate over a certain time lapse, the latter being dynamically managed between a minimum time and a maximum time as a function of the quantity of data to transmit. Finally, the exchange of a speech token makes it possible to dynamically figure the network as a function of a new incomer or an outgoing node.

The transmission of the speech token is capable of being received by all the nodes present in a given zone in a defined frequency channel, that is to say in the radio bubble. Thus, the speech token includes a data frame indicating the next node benefiting from a transmission time window authorising it to transmit. A configuration may occur in which the speech token is transmitted and received by a node of which the identity is not indicated in the speech token as being the next transmitter. Thus, each node includes a calculator making it possible to decode the data frames of the speech token received by radio channel and to exploit the information specifying what is the next node that can transmit. This calculator may be that of the controller. Thus, the speech token is broadcast within the radio bubble and indicates the identity of the next node benefiting from a transmission window.

One interest of the method of the invention is to de-correlate the mechanism of addressing the speech token from the mechanism of transmission of useful data. Thus, for example, when the node NOD5 transmits a speech token to the node NOD7, via the relay node NOD6, data transmitted consecutively to the transmission of the node NOD5 may be destined for the node NOD6. Thus, the transmission protocol of the speech token is independent of the addressings of streams of useful data succeeding or preceding the transmission of the speech token. The mechanisms for addressing the speech token and for addressing useful data involve broadcasting of data with addressings which may be either identical (if data is transmitted to that which receives the speech token), or different (if data is transmitted to another node than that which receives the speech token).

However, the speech tokens and the useful data frames are transmitted within a same frequency channel specific to the radio bubble considered.

Limitation of Interference

When a node is a junction node, that is to say that it joins two IP sub-networks, such as the nodes NOD3 and NOD5, the radio frequency ranges of the two radio bubbles associated with the two IP sub-networks may be configured to limit interference between the radio bubbles.

For example,
the links of the radio bubble S/R_1 may be assured by a first frequency band B1;
the links of the bubble S/R_2 may be assured by a second frequency band B2;
the links of the bubble S/R_3 may be assured by a second frequency band B3.
In this situation, it is possible to configure B1, B2 and B3 in such a way as to limit interferences between different transmissions of nodes of different bubbles. For example, the bands B1, B2 and B3 may be chosen to limit spectral overlaps between these different frequency bands or to take into account the harmonics of a frequency band.

Likewise, the frequency band B4 used for the transmission frequencies of the links of the radio bubble S/R_4 may be chosen to limit interference with the other transmissions. In this case, given that the radio bubbles S/R_1 and S/R_2 on the one hand and that the radio bubble S/R_4 on the other hand have no node in common, the bands B1 and B4 may be close, or even identical, as well as the bands B2 and B4.

In order to limit interference or other phenomena capable of degrading radio transmissions between nodes, the powers and/or the modulations of the signals may be configured as a complement or as an alternative to the configuration of the frequency bands in order to optimise the quality of the radio links.

One advantage is to enable great connectivity of the ad hoc IP network and the taking into account of a number of nodes thanks to the extension permitted by the junctions of different radio bubbles.

Relayed Mode

A second mode of operation is described with regard to the radio bubble S/R_4 representing three mobile nodes NOD5, NOD6 and NOD7. In this radio bubble, the nodes are not all mutually within the radio horizon of the two other nodes. In the case of FIG. 1, the node NOD5 is within radio range of the node NOD6 and can establish communications with the latter. The same is true for the configuration of the nodes NOD6 and NOD7 which mutually see each other directly because they are within "radio view". It may be noted that the nodes NOD5 and NOD7 are beyond their specific radio horizon and cannot establish a link radio directly between each other.

In this case, the node NOD6 plays a particular role by becoming a relay node. The method of the invention makes it possible to identify and to determine automatically a relay node, such as the node NOD6, having a configuration making it possible to relay communications between two nodes being beyond their radio horizon, such as the nodes NOD5 and NOD7. This configuration enables a relayed mode of transmissions within the radio bubble S/R_4. The node NOD5 transmits a speech token that is relayed by the node NOD6 to the node NOD7 which will then generate in turn a transmission window successively to the transmission of the data by NOD5.

The method of the invention allows a relay node to be a priori any node. The operational configuration determines the radio topological configuration. From this viewpoint, it is possible that a relay node is a junction node. Since the radio topology does not have knowledge of the network topology, that is to say the IP topology, the radio configuration of a node does not depend on IP topology. There is thus independence of configuration of an IP node and a radio node even though it involves the same node.

In the case of a radio bubble comprising a relay node, the method still makes it possible to transmit a speech token in the sub-network S/R_4 between the different nodes. A direction is determined during the discovery of the nodes between each other and the node at the initiative of the creation of the relay determines the direction of circulation of the speech token.

In the case of FIG. 2, it is understood that the node NOD6 plays a role of relaying the passage of the speech token in the link TR57. Thus, the speech token transmitted by the node NOD5 in this case is relayed by the node NOD6 to the node NOD7. The node NOD6 at reception of the speech token transmitted by NOD5 is capable of processing the radio addressing data of the speech token and of re-transmitting it in its turn to the node NOD7.

Thus, in relayed mode configuration, the operation of the transmission of the speech token is authorised thanks to the method of the invention.

Looped Mode

FIG. 2 represents a direction of circulation of the speech token between the nodes NOD1, NOD2 and NOD3 when the nodes form a loop and are all within "radio view" of each other in a same radio bubble. A link is noted TR12 to represent the passage of the speech token from the node NOD1 to the node NOD2. The other TRnp links annotated in FIG. 2 follow the same formalism of an exchange of token from the node NODn to the node NODp.

This first mode of operation is represented within the radio bubble S/R_2. The mobile nodes NOD1, NOD2 and NOD3 of the radio bubble S/R_2 are all situated within the radio horizon of the other nodes of the same radio bubble. Thus, the node NOD1 sees the nodes NOD2 and NOD3, the node NOD2 sees the nodes NOD1 and NOD3, the node NOD3 sees the nodes NOD1 and NOD2.

In this case, the method of the invention makes it possible to establish a communication mode based on the exchange of a speech token which is exchanged alternately between two nodes directly within "radio view". The token is exchanged in this case by all the nodes, for example, in a circular manner.

Generally speaking, a looped communication mode is preceded by a "relayed mode". Indeed, a node entering into a radio bubble already comprising two nodes is generally discovered by one of the two nodes already present in the radio bubble. When the priority of one of the three nodes does not impose exclusivity of a communication mode over other nodes, the invitation token comprises an indicator specifying that a node will be the relay node. This mode will be the communication mode in the radio bubble established until the three nodes see each other in "radio view".

Limitation of the Number of Nodes/Sub-Network

According to one embodiment, the method for discovering of the invention makes it possible to limit the number of mobile nodes accessing a same radio bubble, and thus a same IP sub-network. According to one exemplary embodiment, the limitation of the number of mobile nodes in a same radio bubble may be defined with 2 or 3 nodes.

This configuration enables a good compromise to be obtained between:
  the alternation of transmission windows between nodes of a same radio bubble making it possible to limit interference;
  the reservation of bandwidth making it possible to increase the rate within a radio bubble and;
  the re-establishment of a physical layer making it possible to deploy an IP type protocol for transmitting IP packets from one IP sub-network to another thanks to:
    the topological correspondence of the IP sub-networks and the radio bubbles and;
    the presence of junction node(s) making it possible to "see" two sub-networks by means of a router.

Case of a Radio Bubble with Two Nodes

FIGS. 1 and 2 also represent a case of a radio bubble comprising only two nodes NOD3 and NOD4 exchanging a speech token to determine the transmission and reception periods of each node. This case is also called point-to-point link.

Indication of Transmission After Transmission of the Token

When the speech token is transmitted before the useful data are transmitted in the speech window, the method for exchanging data of the invention enables the speech token to include an indicator of data transmitted making it possible to specify if data are transmitted or not successively to the transmission of the speech token transmitted and in what quantity.

When a node does not communicate any data to another node, it transmits the speech token while indicating that no data will be transmitted consecutively to the transmission of the speech token. In this case, the receiving node can re-transmit the speech token rapidly to reserve a transmission time window if useful data have to be transmitted by the latter. To this end, the speech token includes in this case an indicator specifying the presence of data to transmit.

The indicator of data to transmit makes it possible to optimise the rate while only reserving a time window for the transmission of data if data will be transmitted after the transmission of the token.

On the other hand, if the mobile nodes NOD3 and NOD4 have data to transmit reciprocally in turn, the transmission of the token may indicate that data will be transmitted consecutively to the transmission of the token over a predefined time lapse.

In another mode, the speech token is transmitted at the end of transmission. This case makes it possible to close the duration of the transmission window. The node receiving and detecting the speech token having then in its turn a transmission time.

According to a first embodiment, the maximum transmission windows are predefined and may, for example, be configured with a duration of several hundreds of milliseconds. The maximum duration of the windows may be data for configuring the topology of the radio bubble.

According to a second embodiment, the maximum duration of the transmission windows may be determined on the fly. In this case, their duration may be indicated by a frame of the speech token. This makes it possible to configure an architecture dynamically as a function of the needs specific to a particular context.

The configuration of the maximum size of the windows may be a result of a compromise between the desired rate and jitter or induced latency effects.

Transmission of the Topology of Sub-Networks Between Nodes

Moreover, the speech token includes data frames which make it possible to transmit information over a part of the network known to the transmitter node and not yet known to a receiving node. For example, this is the case when the node NOD7 enters into the radio bubble S/R_4. During the discovery of the node NOD7 by the node NOD5 or NODE, two topologies are transmitted.

A first topology, referred to as "radio topology", is transmitted indicating the identity of the nodes present in the radio bubble, the priorities of at least one priority node if need be, the presence of a relay node and potentially topology change data. For example, a relay node can become a node which is no longer a relay node. Successive transmissions of the speech token make it possible to transmit the radio topology of a radio bubble and its modifications over time. Fields reserved for the speech token make it possible to encode this information.

A second topology, referred to as "IP topology", is transmitted by means of the speech token. Each modification of the IP topology can thereby be taken into account during the transfer of the speech token. The IP topology includes the IP addresses of each known node of the IP sub-network. It may notably be IP addresses of the interfaces of the routers in the IP sub-network considered.

Moreover, each router is capable, thanks to a routing protocol and routing data configuration, of exchanging data specific to the routing tables with the other routers.

As an example, when the node NOD7 is discovered by the node NOD6, the IP topology includes the addresses of the sub-networks IP S/R_1, S/R_2 and S/R_3, the IP addresses of each node and the routing tables known by the node NOD6. This topology is transmitted through data frames of the speech token or instead by data frames succeeding or preceding the speech token. An OSPF protocol may be used between IP routers of the network. Although the IP topology data are transmitted potentially through different radio bubbles during the discovery of the IP network, the radio topology and the radio nodes do not have knowledge of the IP architecture.

This is also, for example, the case of the node NOD5 which can communicate with NOD3 information on the new topology of the sub-network S/R_4, such as for example the IP address of the new incomer NOD7 in the IP sub-network S/R_4.

Priority Node

In order to define and/or to optimise:

the strategy for distributing invitation tokens of which notably its transmission frequency by the nodes of a speech bubble and;

The number and the identity of the nodes present in a same radio bubble (priority to the extension of the network);

The minimum threshold of a rate of a frequency channel of a radio bubble (priority to the rate), the invention enables the determination of a priority node to define a strategy adapted to the needs of a particular case.

According to one embodiment, at least three levels of priority may be defined. A maximum priority level P2 is defined and is above an intermediate level of priority P1. The level of priority P0 indicates no priority and thus corresponds to the lowest priority. The priorities are assigned to each node on each radio chain that it has at its disposal.

The management of priority makes it possible to define a first broadband communication mode between a priority node and a second node. When the priority node P2 accesses a radio bubble including the second node for transmitting data to the IP network, then a new radio bubble is formed by these two nodes and can only comprise a maximum of two nodes. This makes it possible to increase the rate of the channel between the two nodes and to reserve a larger bandwidth/rate resource.

The other nodes participating in the original topology are excluded from the new radio bubble integrating the node of priority P2. The IP communications established on the preceding radio bubble are then broken and new communications start between the nodes involved in the new radio bubble.

When the priority node P2 discovers a new node, the exchange of the invitation token between the two nodes makes it possible to define a new radio bubble that will be limited to the presence of these two nodes.

When a node has a priority P2, the relay mode is not authorised.

A second communication mode is described in which the level of priority of a node of a radio bubble is associated with the priority P1. The priority node P1 imposes its priority during the method for discovering one or more other nodes of a same radio bubble not having priority (priority P0). The priority P1 authorises radio bubbles comprising three nodes. The management of a relay node is then permitted.

The levels of priority P1 and P2 enable the node that expresses them to choose the other node or nodes with which it constitutes the radio bubble.

Those which are not retained can initiate another bubble on another frequency.

One advantage of the management of different levels of priority is to enable a radio topology to adapt to different needs of nodes of a same radio bubble. Thus, the management of three levels of priority makes it possible to adapt an architecture of radio bubble(s) optimised according to the needs of nodes according:

either priority to the reservation of a maximum rate;

or priority to the extension of the network to a maximum of nodes having the best interest of communication with each other.

Network Layer—TCP/IP

Figure 3:
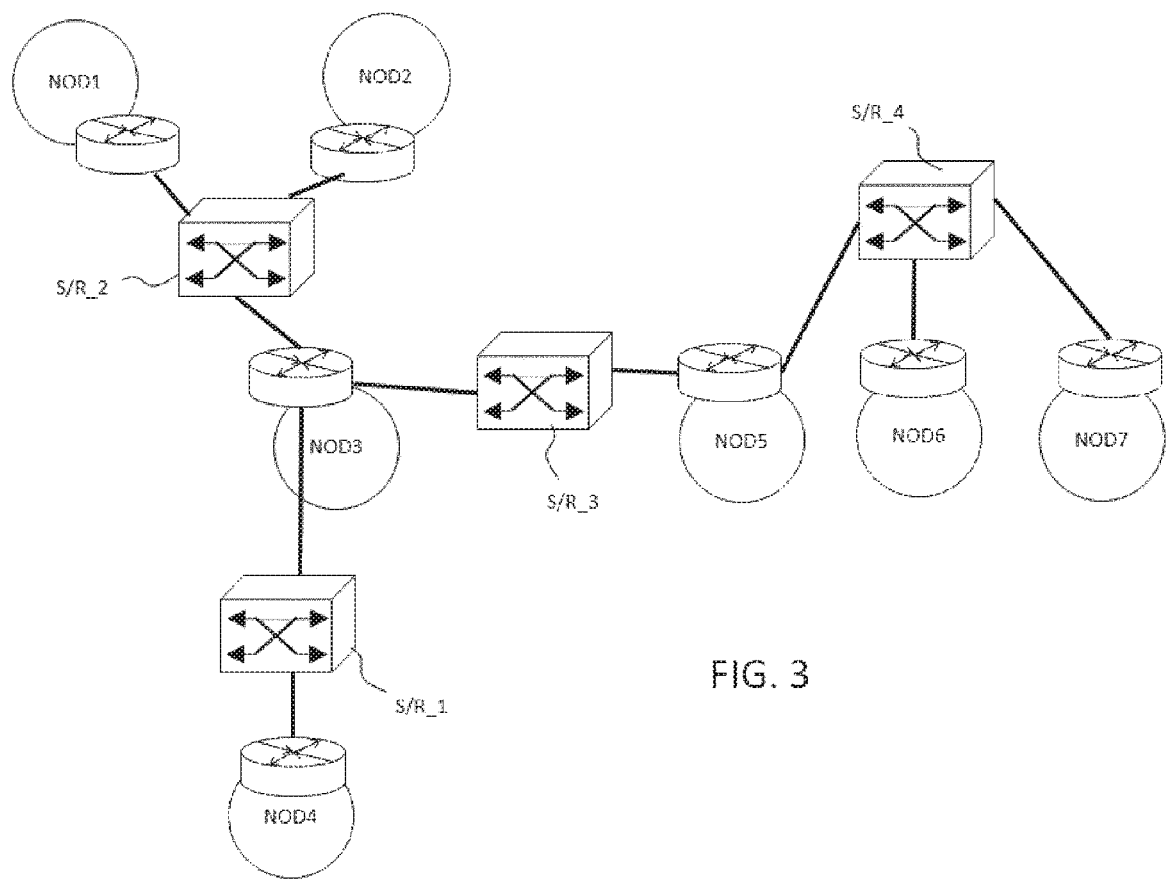
FIG. 3: the network established according to the method of the invention of FIGS. 1 and 2 offering a network architecture of IP network type.

FIG. 3 represents the network from the IP protocol viewpoint. Each node is associated with an IP router. Thus, each IP router is capable of routing IP packets according to a known IP topology of the network. The transmission takes place step by step through the calculation of a routing path. Each controller of each node, thanks to a switching table, is then capable of associating a radio bubble making it possible to reach the next router of a route calculated beforehand. The routing of IP packets is permitted thanks to a physical protocol of data exchanges as described previously and making it possible to reduce interference between the different nodes. The IP network thereby constituted makes it possible to establish a dynamic network easily adaptable to the discovery of new nodes.

To process the interface between the radio layer and the IP layer at the level of a node, the IP controller of the invention is capable of processing the data of the radio layer to the IP layer and vice versa from the IP layer to the radio layer.

The controller of the invention decodes the stream of data received by a radiofrequency antenna of a node. Among the data received, the controller extracts the radio frames received: the IP frames. The IP frames are then routed to the IP router which processes the routing of the IP packets thanks to a routing table.

When the router routes the IP packet to another router, it determines the IP address of the next router of the IP sub-network having to be addressed. The IP packet is addressed to the controller of the node which encapsulates the IP data in a radio frame. The radio frame header includes a radio identity of a radio node in the radio bubble. The controller of the invention includes a switching table associating the MAC addresses (interface address) of each router of an IP sub-network with its radio identity within the radio bubble.

If an IP frame is destined for the node of which the router decodes the frame, then the data are processed locally and transmitted to an equipment interface allowing, for example, an operator to receive these data, to save them or to exploit them directly.

If an IP frame is destined for a node other than the node receiving the frames, the controller establishes a correspondence between:

on the one hand, the IP route making it possible to address the IP data to the destination node in the IP network and;

on the other hand, the radio bubble in which a node of the route is present so as to route step by step the IP data frames to the destination node.

The data controller of the invention makes it possible to construct radio frames with an adequate addressing as a function of IP frames received and vice versa. The radio addressing includes the coding of the identity of the radio node addressed in the radio bubble. The radio node may be:

an intermediate IP node present in the route calculated by the router or;

a destination node.

The radio frame is then transmitted by the node after having received the speech token in the appropriate radio bubble.

Furthermore, one advantage of the invention is that the controller of the invention does not apply any mechanism aiming to guarantee the routing of data (acknowledgements, retransmission), just as the IP layer does not do so, in so far as this approach involves above IP layers (TCP). The controller nevertheless carries out an integrity control in order not to deliver erroneous frames to the IP router.

Figure 4:
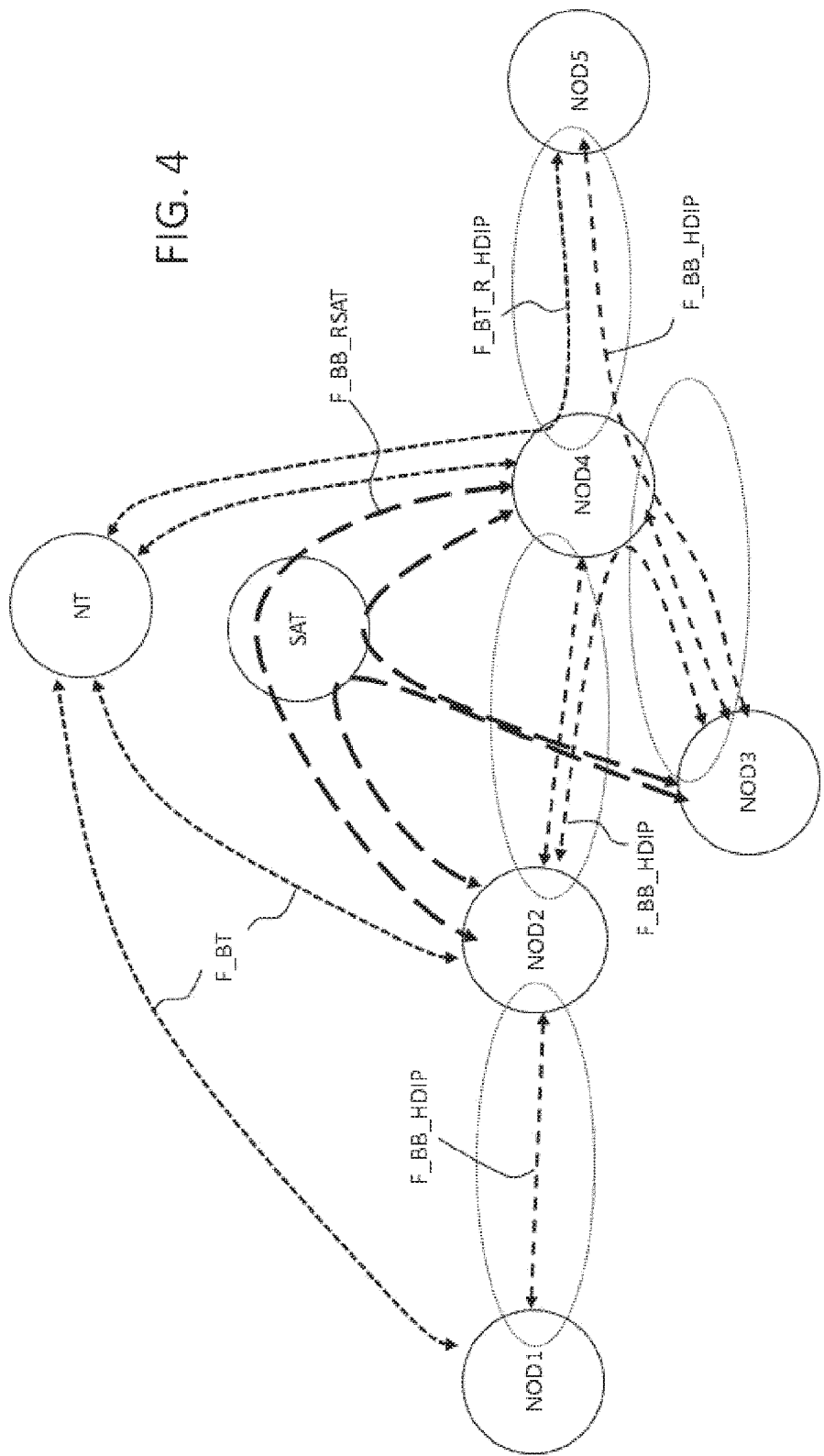
FIG. 4: a representation of physical links based on radio and satellite links making it possible to extend the coverage of the network established according to the method of the invention.

FIG. 4 represents a case in which radio bubbles may be established between different nodes. As an example, a link F_BT_RSAT corresponds to a link between a satellite and a NOD, for example a ship. In FIG. 4, links represent the physical channels making it possible to establish radio bubbles between two or three nodes for each radio bubble.

The node SAT corresponds to a satellite and the node NT corresponds to a terrestrial node for example present on a hill near to the sea. The nodes $NOD_{i, i \in [1;N]}$ represent ships.

The links F_BB _HDIP relate to the physical links between two nodes $NOD_{i, i \in [1;N]}$ such as ships.

The links F_BT _HDIP relate to the physical links between a node $NOD_{i, i \in [1;N]}$ such as a ship and a node NT such as a terrestrial node.

The links F_BB_RSAT relate to the links between two nodes $NOD_{i, i \in [1;N]}$ such as two ships via a satellite SAT. The links F_BT relate to the links between a node $NOD_{i, i \in [1;N]}$ such as a ship and a terrestrial node such as a terrestrial station noted NT in FIG. 4.

Such an IP network may be supported according to the methods of the invention thanks to the implementation of radio bubbles each comprising a limited number of nodes. Thus, according to the diagram of FIG. 4, the node NOD5 can theoretically transmit data to the node NOD1 via different physical paths, such as for example:
Path 1: NOD5→NOD4→NOD2→NOD1
Path 2: NOD5→NOD4→NOD2→NT→NOD1
Path 3: NOD5→NOD4→SAT→NOD2→NOD1
Path 4: NOD5→NOD4→SAT→NOD2→NT→NOD1
Path 5: NOD5→NOD4→NOD3→NOD2→NOD1
Path 6: NOD5→NOD4→NOD3→SAT→NOD2→NOD1

The router of the node NOD5, knowing the topology of the ad hoc IP network, is capable of determining a route calculated as the most optimum as a function of the rates of each physical link or other routing constraints according to the quality of service associated with the data transmitted. As an example, the physical link NOD5→NOD4→NT→NOD1 may be considered as the most optimal.

Controller

The controller of the invention is thus capable of processing radio data in order to exploit them in the IP network and conversely it is capable of processing IP data to route them via a physical link such as a radio bubble.

The IP controller includes a switching table associating the identities of each node of a radio bubble known by the controller with a MAC address (i.e. hardware) of a router of the corresponding IP sub-network. Thus, a controller is capable of addressing radio frames encapsulating the IP frames to the node of the radio bubble corresponding to the addressed router.

The switching table also includes an association of each node identity with an identity of a known radio bubble. Thus, the controller can address different radio chains. This association can simply make a radio interface of the controller correspond with a given radio node. Thus, when a node is addressed, the controller determines the output port (or the interface) on which the packets have to be transmitted to be processed by the appropriate radio chain of the node. This configuration notably makes it possible to assure the role of junction node to a node belonging to two radio bubbles.

When the radio frames are decoded, the controller is able to deliver the IP packets to the router. The router is then capable of:
  Either saving the IP data or transmitting them to an interface of the node receiving these data so that they can be exploited by an operator;
  Or calculating a new IP address of a router of the sub-network as a function of the routing table and re-transmitting these data to the radio stage so that they are transmitted and addressed to a node radio within the radio bubble.

Another DHCP addressing function may be assured by the controller. According to one embodiment, the controller is capable of allocating during the initialisation or the configuration of the router at least one IP address to said router. This makes it possible to assure coherence in IP addressing policy. The controller is thus capable of playing a role of DHCP server.

According to one embodiment, the controller includes a link cipherer ciphering the data transmitted to the radio chain.

Method for Discovering

The method for discovering of the invention thus enables two nodes mutually arriving within the radio perimeter of the other node to establish a radio bubble and thus an IP sub-network. The method thus includes the generation of an IP sub-network and the generation of IP addressing of the IP sub-network and the nodes. Each node knowing other nodes then transmits the IP topology.

The discovery is established by transmitting an invitation token of a node in a zone corresponding to a radio range of the node. When a node lies within this zone and receives the invitation token, it is invited to respond in a time window assigned to this invitation. The identities are exchanged during this exchange of data. When the two nodes have conducted this exchange of information, the process of generating a radio bubble and an IP sub-network starts.

The two nodes exchange a speech token in order to organise the data exchanges between the two nodes. A particular configuration of the method of the invention enables two nodes to transmit invitation tokens regularly in order to invite a third node into the radio bubble.

Thus, the method for discovering also relates to the extension of a radio bubble to a new incomer without however generating a new IP sub-network or a new radio bubble.

The method for discovering of the invention includes steps making it possible to determine if a new radio bubble has to be created or if a radio bubble has to be extended as a function of:
  the priority levels of the nodes and;
  the number of nodes being discovered.

The method for discovering of the invention includes all the necessary steps making it possible to carry out the discovery functions described previously.

Method for Exchanging Data

The invention also relates to a method for exchanging data enabling a set of nodes to exchange IP frames through physical links between nodes. The physical links are, in the context of the invention, radiofrequency links. The method for exchanging data of the invention, within a radio bubble, is coordinated by the transmission of a speech token and the definition of transmission time windows allocated according to the context to each node receiving in turn said token. The method for exchanging data includes all the processing steps participating in the addressing of the data within the IP network. These steps are, notably, carried out by the controller which makes it possible to establish a dialogue between the IP layer and the radio layer.

The method for exchanging data of the invention includes all the necessary steps making it possible to carry out the functions for exchanging data described previously between the different nodes.

The invention claimed is:

1. A method for discovering a node of an ad hoc network among a plurality of mobile nodes, the method comprising:
   periodically transmitting, by an antenna of a first mobile node, a first radiofrequency signal including an invitation token, the invitation token comprising data relating to an identity of the node which transmits said invitation token;
   detecting, by a second mobile node, the first signal and extracting the data contained in the invitation token of the first node;
   transmitting, by an antenna of the second node, a second radiofrequency signal including at least one acknowledgement of the invitation token, said transmission being carried out in an assigned time window subsequent to the reception by the second node of the invitation token;
   creating a radio bubble subsequent to the reception by the first node of at least acknowledgement of the invitation token, communications between the nodes of the radio bubble being coordinated by the transmission of a speech token between said nodes, the transmission of said speech token between the nodes of a radio bubble defining a transmission sequence between the different nodes;
   creating an IP sub-network between the nodes of the radio bubble, each node including an IP address within the IP sub-network range;
   wherein the speech token or the invitation token includes:
   a priority indicator of a node of the radio bubble indicating the maximum number of nodes with which said radio interface can form a radio bubble and;
   an indicator of a transmission mode among a looped mode and a relayed mode specifying, if needed, the identity of the relay node.

2. The method for discovering a node according to claim 1, wherein a radio bubble is associated with a frequency channel shared between the nodes of said radio bubble.

3. The method for discovering a node according to claim 1, wherein a maximum size of time window is determined by a node of which the priority is maximum in a radio bubble.

4. The method for discovering a node according to claim 2, wherein the discovery token and/or the speech token include(s), if needed, the identity of a priority node of the radio bubble.

5. The method for discovering according a node to claim 2, wherein a first node having already discovered at least one second node and having already generated a first radio bubble in a first frequency channel and discovering a third node determines, as a function of:
   the number of nodes in the radio bubble and;
   the value of the priority indicator of the already discovered nodes of said radio bubble,
the integration conditions of the third node among which:
   the third node integrates the first radio bubble joining the two other nodes, the first radio bubble including three nodes of which the communications are organised by the transmission of a speech token between said three nodes;
   a new radio bubble is formed between the third node and the first or second node, one of the first or second nodes not then being integrated in the new radio bubble thereby formed, the first radio bubble being terminated;
   the third node is not invited to integrate the first radio bubble.

6. The method for discovering a node according to claim 5, wherein the discovery operates by the transmission of an invitation token by the first node to which the third node responds favourably in an assigned time window.

7. The method for discovering a node according to claim 5, wherein beyond a number of three nodes, the discovery of a fourth node can lead to different scenarios according to the priority of each node of which:
   the integration of the fourth node in the radio bubble involving the exiting of one of the three nodes already present in said radio bubble;
   the integration of the fourth node in the radio bubble involving the exiting of two of the three nodes already present in said radio bubble;
   the fourth node is not invited to integrate the radio bubble.

8. The method for discovering a node according to claim 5, wherein the first node indicates that it is a relay node in the invitation token from the indicator of transmission mode.

9. The method for discovering a node according to claim 8, wherein the plurality of nodes includes a relay node, a first node visible to the relay node and a second node visible to the relay node, the first node and the second node not being within the radio horizon of each other, and wherein a relay node is configured to determine:
   when the data received from the first node visible to the relay node are either relayed to the second node visible to the relay node, or processed by the relay node;
   when the data received from the second node visible to the relay node are either relayed to the first node visible to the relay node, or processed by the relay node.

10. The method for discovering a node according to claim 5, wherein when the first node detects a maximum priority indicator of the third node and when a new radio bubble is defined between the first and third node, the second node is excluded from said radio bubble and the first radio bubble is terminated.

11. The method for discovering a node according to claim 1, wherein the invitation token or the speech token transmitted by a first node further includes:
   radio topology data including a set of identities of nodes already discovered by the first node of a first radio bubble;
   topology data of a known IP network of the first node including:
      the set of known IP sub-networks of each node of the radio bubble;
      the IP addresses of each known node of the nodes of the IP sub-network corresponding to the first radio bubble;
      the MAC addresses of the routers associated with each known node.

12. The method for discovering a node according to claim 2, wherein at least one node determines an indicator of a transmission mode of a speech token according to the configuration of the nodes discovered imposing the activation of a looped mode or the activation of a relayed mode, when the relay mode is activated, and, if needed, a choice of a relay node, said indicator of the transmission mode being transmitted to the other nodes by:
   a generation of an indicator of a transmission mode in the invitation token or the speech token, or both;

a generation of an identity of the next node having to receive the speech token.

13. The method for discovering according a node to claim 2, further comprising:
    establishing a first radio bubble between three nodes, of which at least one node is a relay node and the two other nodes being nodes visible to the relay node and not being in the radio horizon of each other, said relay node relaying by radio channel the speech token along one direction to establish a transmission loop of the speech token between the three nodes of the radio bubble;
    receiving by a first node visible to the relay node an invitation token coming from the second node visible to the relay node of the first radio bubble;
    transmitting an acknowledgement by the first visible node of the relay node receiving the invitation;
    transmitting to the relay node by the second node visible to the relay node of a new topology of the radio bubble in which each node is within the radio horizon of the other nodes of the radio bubble and comprising:
        at least the identity of the first node visible to the relay node discovered by the second node visible to the relay node and;
        an indicator of transmission mode designating the looped mode;
    suspending the relay mode.

14. The method for discovering a node according to claim 1, wherein the transmission frequency of the speech token is higher than that of transmission of an invitation token.

15. The method for discovering a node according to claim 14, wherein the transmission frequency of the invitation token within a radio bubble is configurable by the node of highest priority.

16. A method for exchanging data between at least two mobile nodes of an ad hoc IP network, said IP network including at least two IP sub-networks connected through a junction node connected to these two IP sub-networks the method comprising:
    first exchanging a speech token in turn within a set of nodes forming a first radio bubble corresponding to a first IP sub-network and in which the mobile nodes are known to each other, each node including radio transmission means, referred to as radio chain, enabling it to exchange data in a first frequency band with at least one other node of the first radio bubble in transmission time windows coordinated by the circulation of the speech token;
    second exchanging the speech token making it possible to coordinate data exchanges within a second radio bubble corresponding to a second IP sub-network and including a plurality of nodes;
    IP addressing at least one IP frame by a node of the first IP sub-network destined for a node of the second IP sub-network using a router and a routing protocol comprised in each node, said node having knowledge of an IP topology of the first IP sub-network, said IP frame being encapsulated in a radio frame and transmitted in the first radio bubble destined for the junction node;
    transmitting the IP frame to the destination node of the second IP sub-network through the junction node, said transmitting including:
        emitting, using a second radio chain, the IP frame encapsulated in a radio frame to the destination node of the second radio bubble,
        associating, using a switching table, an identity of a known node with a radio chain of the junction node; wherein the speech token includes:
        a priority indicator of a node of the radio bubble indicating the maximum number of nodes with which said radio interface can form a radio bubble and;
        an indicator of a transmission mode among a looped mode and a relayed mode specifying, if needed, the identity of the relay node.

17. A controller of data of a mobile node, comprising:
    one to four radio interfaces for transmitting and receiving radio frames coming from at least one radio chain within a frequency channel;
    a memory for storing:
        topology data of at least one radio bubble comprising:
            at least one set of identities of nodes communicating in said bubble thanks to an allocated frequency channel;
            a priority indicator of said node, the priority indicator being specific to each radio interface and indicating the maximum number of nodes with which said radio interface can form a radio bubble;
            an indicator of a transmission mode of said node indicating if the transmission is in relay or looped mode;
        a switching table associating:
            identities of nodes in a radio bubble with router MAC addresses, each node being associated with a router;
            identities of nodes in a radio bubble with an addressing of at least one radio chain;
    a calculator for processing radio topology data in reception, said calculator being configured to:
        analyze a priority indicator in the radio frames received making it possible to modify if necessary the topology of at least one radio bubble;
        analyze an indicator of a transmission mode making it possible to modify if necessary the topology of at least one radio bubble;
        generate radio frame headers as a function of IP data received and a comparison of these data with the switching table, the radio frames being transmitted to a radio chain;
        process the radio frames received to generate IP frames to an output interface.

18. A controller of data of a mobile node according to claim 17, comprising a calculator configured to:
    receive and generate a speech token;
    receive and generate an invitation token periodically so as to engage a method for discovering in the event of reception of a response to an invitation;
    processing steps of a method for discovering a node of an ad hoc network among a plurality of mobile nodes;
    processing the steps of a method for exchanging data between at least two mobile nodes of an ad hoc IP network, said IP network including at least two IP sub-networks connected through a junction node connected to these two IP sub-networks.

19. A communication system of a mobile node for the exchange of IP data in an ad hoc network, comprising:
    at least one radio chain including means for transmitting and receiving radiofrequency signals;
    at least one controller according to claim 17;
    an IP router for processing IP frames coming from the controller and determining their routing in the IP network.

20. The method for discovering a node according to claim 1, further comprising time stamping a reception or transmission of the invitation token or the speech token.

\* \* \* \* \*